(12) United States Patent
Takahashi

(10) Patent No.: US 7,515,819 B2
(45) Date of Patent: Apr. 7, 2009

(54) SOLID-STATE IMAGE PICKUP DEVICE FOR AUTO-FOCUS AND AUTO-FOCUS CAMERA USING THE SAME

(75) Inventor: Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 10/562,646

(22) PCT Filed: Apr. 7, 2005

(86) PCT No.: PCT/JP2005/007188

§ 371 (c)(1),
(2), (4) Date: Dec. 28, 2005

(87) PCT Pub. No.: WO2005/098501

PCT Pub. Date: Oct. 20, 2005

(65) Prior Publication Data

US 2007/0098389 A1   May 3, 2007

(30) Foreign Application Priority Data

Apr. 9, 2004 (JP) .............................. 2004-115629

(51) Int. Cl.
*G03B 3/10* (2006.01)
*H01L 27/00* (2006.01)
(52) U.S. Cl. .................... 396/121; 396/111; 250/208.1; 348/315
(58) Field of Classification Search ......... 396/121–123, 396/233–234, 100–101, 112, 96, 104, 111, 396/128, 119, 125; 348/349, 345, 350, 353, 348/356, 315; 250/201.8, 207.2, 208.1
See application file for complete search history.

(56) References Cited

U.S. PATENT DOCUMENTS 6,549,730 B1   4/2003 Hamada ..................... 396/111

(Continued)

FOREIGN PATENT DOCUMENTS

EP      0 834 757 A2   4/1998

(Continued)

OTHER PUBLICATIONS

Japanese Official Action in Japanese Patent Application No. 2004-115629 (with partial translation).

(Continued)

*Primary Examiner*—Reena Aurora
(74) *Attorney, Agent, or Firm*—Fitzpatrick, Cella, Harper & Scinto

(57) ABSTRACT

The invention provides a solid-state image pickup device for an auto-focus and a camera for an auto-focus in which focusing precision is improved. The device has first and second linear sensor pairs (for example, 2-1, 2-2) each having a linear sensor for a base portion with a plurality of pixels and a linear sensor for a reference portion with a plurality of pixels in order to perform a focal point detection of a TTL passive-type phase detection system. The first and second linear sensor pairs have the same pixel pitch, the first and second linear sensor pairs are neighboring in parallel and are arranged so as to be relatively deviated in the arranging direction of the linear sensors, and a signal output to detect the focal point is executed by using both of the first and second linear sensor pairs.

7 Claims, 11 Drawing Sheets

U.S. PATENT DOCUMENTS

| | | | |
|---|---|---|---|
| 6,577,344 B2 | 6/2003 | Kadohara et al. | 348/350 |
| 6,625,397 B2 | 9/2003 | Nagata | 396/106 |
| 6,704,051 B1 | 3/2004 | Takahashi | 348/315 |
| 6,768,867 B2 | 7/2004 | Kindaichi et al. | 396/100 |
| 6,781,624 B1 | 8/2004 | Takahashi | 348/241 |
| 6,803,614 B2 | 10/2004 | Takahashi | 257/292 |
| 6,973,265 B2 | 12/2005 | Takahashi | 396/121 |
| 7,164,447 B2 | 1/2007 | Takahashi | 348/350 |
| 2002/0003582 A1 | 1/2002 | Kadohara et al. | 348/345 |
| 2002/0003958 A1 | 1/2002 | Nagata | 396/106 |
| 2003/0059216 A1 | 3/2003 | Takahashi | 396/121 |
| 2003/0160887 A1 | 8/2003 | Takahashi | 348/350 |
| 2004/0042780 A1 | 3/2004 | Kindaichi et al. | 396/112 |
| 2006/0045506 A1 | 3/2006 | Takahashi | 396/96 |
| 2007/0047939 A1 | 3/2007 | Inoue et al. | 396/102 |

FOREIGN PATENT DOCUMENTS

| | | |
|---|---|---|
| EP | 0 977 427 A2 | 2/2000 |
| JP | 59-105606 | 6/1984 |
| JP | 61-28913 | 2/1986 |
| JP | 61-028913 | 2/1986 |
| JP | 64-80920 | 3/1989 |
| JP | 3-164709 | 7/1991 |
| JP | 03-164709 | 7/1991 |
| JP | 06-018779 | 1/1994 |
| JP | 6-18779 | 1/1994 |
| JP | 10-104503 | 4/1998 |
| JP | 11-14900 | 1/1999 |
| JP | 11-191867 | 7/1999 |
| JP | 11-211467 | 8/1999 |
| JP | 11-281877 | 10/1999 |
| JP | 2000-180706 | 6/2000 |
| JP | 2001-100258 | 4/2001 |
| JP | 2001-337264 | 12/2001 |
| JP | 2003-107340 | 4/2003 |
| JP | 2004-20742 | 1/2004 |
| JP | 2004-020742 | 1/2004 |

OTHER PUBLICATIONS

Jun. 21, 2005 International Search Report in PCT/JP2005/007188.
Jun. 21, 2005 Written Opinion in PCT/JP2005/007188.
Hidekazu Takahashi, et al., "CMOS Linear Autofocus Sensor for 7-point Wide Area Autofocus System", Technical Report of the Institute of Image Formation and Television Engineers, vol. 25, No. 28, pp. 1-6 (Mar. 2001).
Jun. 21, 2005 International Preliminary Report on Patentability (Chapter I) with Written Opinion in in PCT/JP2005/007188.

SOLID-STATE IMAGE PICKUP DEVICE FOR AUTO-FOCUS AND AUTO-FOCUS CAMERA USING THE SAME

TECHNICAL FIELD

The invention relates to realization of high precision of a solid-state image pickup device for auto-focus (hereinbelow, also referred to as AF) and, more particularly, to an AF sensor of a TTL-SIR (Through The Lens Secondary Imaged Registration: secondary image forming phase difference detection) type and an AF camera using such an AF sensor.

BACKGROUND ART

A conventional TTL-SIR type AF sensor has been disclosed in detail in "CMOS Linear Auto-focus Sensor for 7-point Wide Area Auto-focus System", ITE Technical Report, Vol. 25, No. 28, pp. 1-6, 2001, or the like by the applicant of the present invention.

FIG. 9 shows a layout of linear sensors of such a solid-state image pickup device for AF. To perform the detection of 7 points including the center cross detection, eight linear sensor pairs 131 are arranged on a same semiconductor substrate 130 in correspondence to the detecting points. By arranging two kinds of linear sensor pairs in the horizontal and vertical directions in a crucial shape with respect to the center detecting point, the cross AF for executing both of the vertical line detection and the lateral line detection can be realized. In those devices, a light beam which passed through a photographic lens is guided to a linear sensor 132 for a base portion and a linear sensor 133 for a reference portion arranged on the AF sensor. Two object images are formed again at two positions on the linear sensors 132 and 133 by a secondary image forming optical system and a phase difference between those two object images is detected, thereby obtaining a defocusing amount (actually, by executing a correlation arithmetic operation of a signal of the base portion and a signal of the reference portion, resolution of focusing precision is improved). Detecting precision in the above system largely depends on a pixel pitch and a base-line length of the linear sensor (distance between an optical center of the linear sensor for the base portion and that of the linear sensor for the reference portion). Generally, if the pixel pitch is small and the base-line length is large, the focusing precision can be raised more. However, if the base-line length is increased, a chip size and a size of optical unit also increase. Therefore, if the pixel pitch is decreases, it is more effective for miniaturization of the camera.

Several techniques of improving the focusing precision by another method have been also disclosed. A focus detecting apparatus of a camera which has a sensor array of a large pixel pitch and a sensor array of a small pixel pitch and in which, when a focus detection is disabled in one sensor array, the focus detection is executed by using an output of the other sensor array is disclosed in Japanese Patent Application Laid-Open No. S64-80920. An apparatus in which, as a sampling pitch for sampling an object image, a plurality of kinds of sampling pitches including an initial state can be selected and, by switching the pixel pitch in accordance with a spatial frequency of an object and executing the focus detection, the focusing precision can be improved has also been disclosed in Japanese Patent Application Laid-Open No. H11-14900. The focusing precision can be improved by providing one more linear sensor other than the linear sensors which are ordinarily used or by changing the pixel pitch. A capturing ratio (ratio at which the object can be focused) of the object is also improved.

In the above conventional techniques, however, since there is sensitivity distribution also in the pixel, there is a case where the precision deteriorates in dependence on the image forming position of the object image. The case where the focusing precision deteriorates will be described hereinbelow.

FIG. 10 is a diagram showing sensitivity distribution within a cell along the horizontal direction in the pixel of the general AF sensor. The sensitivity at the center of each of photodiodes 110-1 to 110-5 serving as pixels is the highest. As the position approaches the pixel edge, the sensitivity deteriorates and the sensitivity in an isolation region 128 is low. FIG. 11 shows a relation between an object image formed on the photodiode 110-3 and outputs from the AF sensor regarding the photodiodes 110-1 to 110-5. In FIG. 11, the object image is formed at almost the center of the photodiode 110-3, so that the output of the photodiode 110-3 is the largest. The signals of the photodiodes 110-2 and 110-4 adjacent to the photodiode 110-3 are outputted at a certain ratio due to crosstalks from the photodiode 110-3. If the object image is formed in the isolation region between the photodiodes 110-3 and 110-4 as shown in FIG. 12, since magnitudes of the outputs of the photodiodes 110-3 and 110-4 are almost equal, it is determined to be unspecified in which pixel on the right or left side of the isolation region a peak of the object image is located. Thus, even if the same object is auto-focused, an arithmetic operation result differs every time. To reduce such an influence, it is preferable to reduce the horizontal pixel pitch. For example, if the pixel pitch is reduced to half, a focusing error is also reduced to about half. However, since the sensitivity deteriorates if the pixel pitch is simply reduced, there is a case where the AF itself cannot be performed at the time of low luminance. To reduce the pixel pitch without deteriorating the sensitivity, it is required to introduce a fine-patterning process. However, since a long developing period of time and very high developing costs are necessary to accomplish the fine-patterning process, it is difficult to develop the solid-state image pickup device for the AF with low costs in a short period of time.

DISCLOSURE OF THE INVENTION

It is an object of the invention to realize a solid-state image pickup device for the AF having AF performance of high precision.

Another object of the invention is to realize a solid-state image pickup device for the AF having AF performance of a high sensitivity.

Still another object of the invention is to realize a solid-state image pickup device for an AF which can accomplish the above objects without needing the fine-patterning process.

To accomplish the above objects, according to the invention, there is provided a solid-state image pickup device for an auto-focus comprising first and second linear sensor pairs each having a linear sensor for a base portion with a plurality of pixels and a linear sensor for a reference portion with a plurality of pixels in order to perform a focal point detection of a TTL passive-type phase detection system, wherein the first linear sensor pair and the second linear sensor pair have the same pixel pitch, the first linear sensor pair and the second linear sensor pair are neighboring in parallel and are arranged so as to be relatively deviated in the arranging direction of the linear sensor for the base portion and the linear sensor for the reference portion (zigzag layout), and a signal output to detect the focal point is executed by using both of the first linear sensor pair and the second linear sensor pair. In the construction of the invention, in the case where the object image is formed in the isolation region of one linear sensor pair and the detection result becomes unstable, the focal point can be detected by the other linear sensor pair in which the pixels have been deviated, so that the deterioration of the focusing precision can be eliminated. By equivalently reducing the pixel pitch to half, the focusing precision can be also improved.

In the invention, by line-symmetrically arranging the two linear sensor pairs, the two linear sensor pairs are closely arranged, so that a detection error for the positional deviation of the object is eliminated.

In the invention, by arranging two sets of linear sensors having different base-line lengths on the same straight line, the higher precision AF can be realized.

In the invention, by using the linear sensor pair arranged in a zigzag shape and the two kinds of linear sensor pairs having different base-line lengths arranged in the direction which perpendicularly crosses zigzag-shaped linear sensor pair, the crossing point can be detected and both of the high-precision AF and the high-sensitivity AF can be realized.

According to the invention, the solid-state image pickup device for the AF having the high precision, high stability, high object capturing ratio, and high sensitivity can be realized. By forming an intelligent circuit board on which the various functions of the invention have been built as one chip, both of the miniaturization and low costs of the device are also realized. Therefore, the solid-state image pickup device for the AF which is optimum for use in a small digital single-lens reflex camera of a low price can be realized.

BEST MODE FOR CARRYING OUT THE INVENTION

Embodiments of the invention will be described in detail hereinbelow with reference to the drawings.

EMBODIMENT 1

Figure 1:
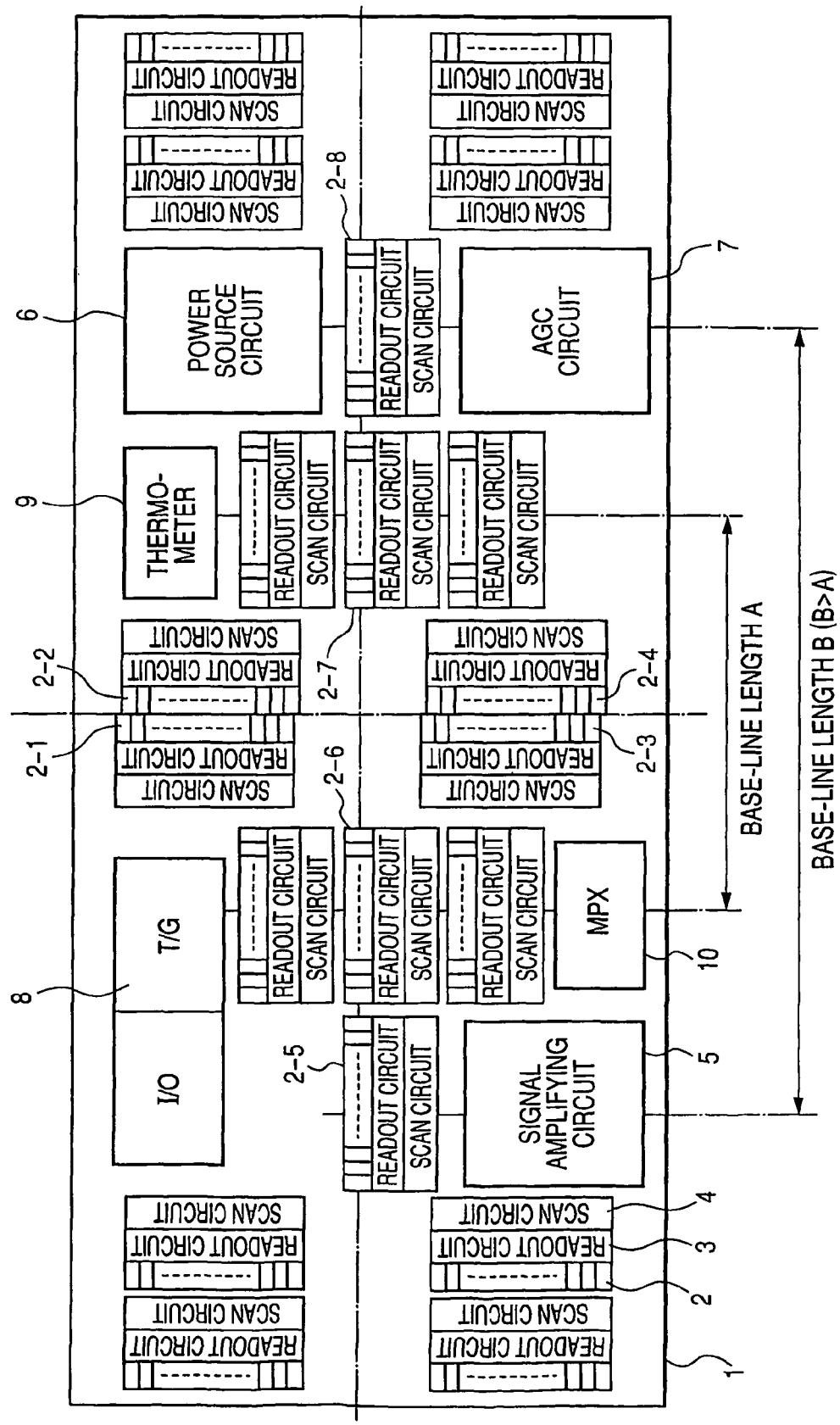
FIG. 1 is a plan view showing a layout of the first embodiment of the invention.
Figure 4:
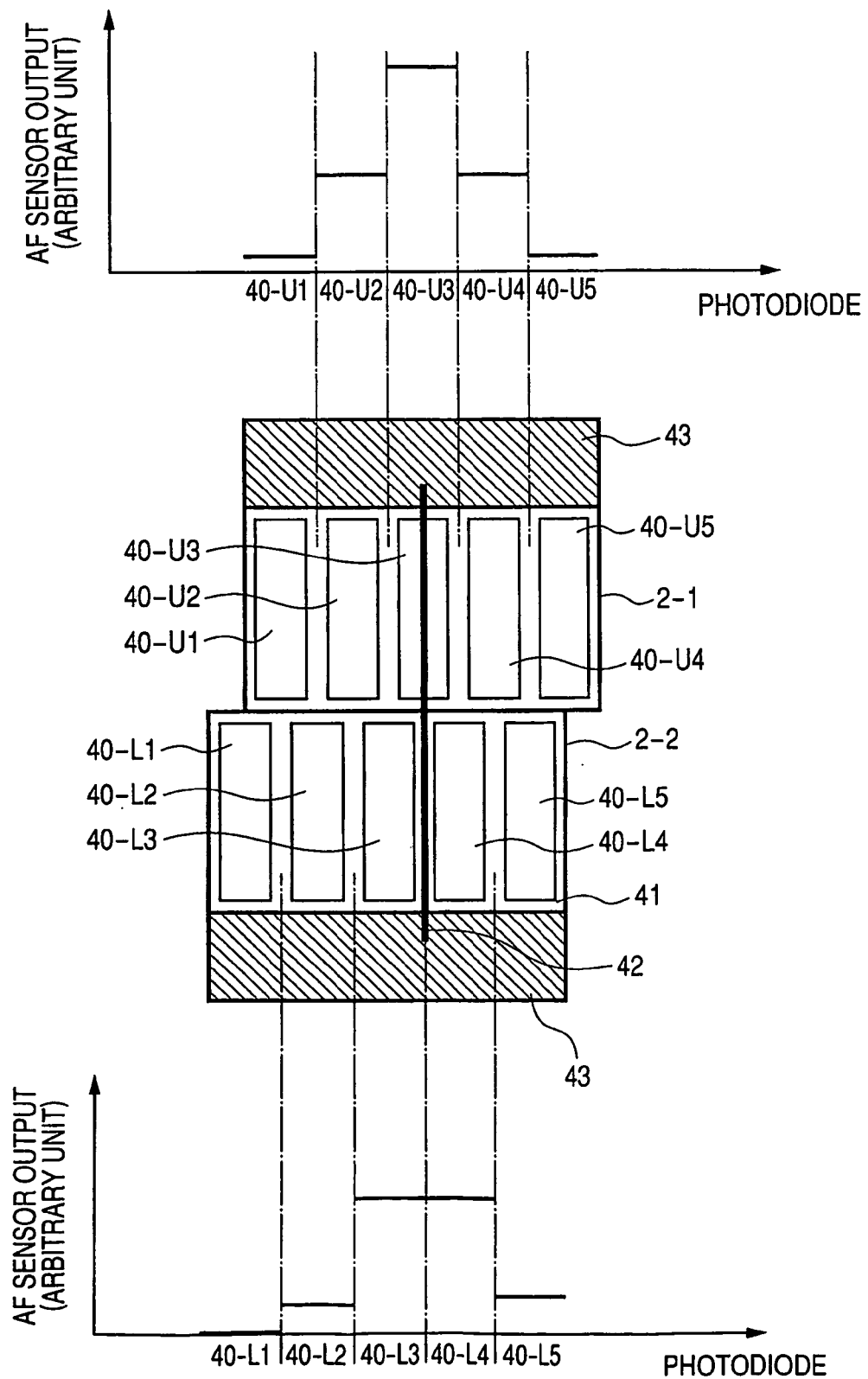
FIG. 4 is a diagram for explaining effects of the first embodiment of the invention.

FIG. 1 is a diagram most preferably showing a feature of the invention and is a schematic plan view showing a layout of a solid-state image pickup device to which the invention is applied. FIG. 4 is a diagram for explaining a layout of linear sensor pairs and its effects.

In the diagram, reference numeral 1 denotes an Si semiconductor substrate; 2 photodiode arrays each constructing a linear sensor (photodiode arrays arranged vertically with respect to a center detecting point of the Si semiconductor substrate are shown at 2-1 to 2-4); 3 an AF sensor readout circuit; 4 a scan circuit for scanning the AF sensor readout circuit 3; 5 a signal amplifying circuit for amplifying a signal from an AF sensor block; 6 a power source circuit for making an analog circuit operative; 7 an AGC circuit for deciding an accumulation time of the AF sensor and a gain of a signal output circuit; 8 a logic circuit (T/G) for driving the sensor; 9 a thermometer for measuring a temperature of a chip; and 10 a multiplexer circuit (MPX) for selectively reading out various analog signals.

As shown in FIG. 1, at the center of the Si semiconductor substrate, the photodiode arrays 2-1 to 2-4 vertically arranged with respect to the center detecting point are arranged in such a manner that the photodiode arrays 2-1 and 2-2 are arranged in parallel so as to be neighboring so that their positions are relatively deviated (zigzag arrangement) and the photodiode arrays 2-3 and 2-4 are also similarly arranged in parallel so as to be neighboring so that their positions are relatively deviated (zigzag arrangement). The photodiode arrays 2-1 and 2-3 construct the first linear sensor pair and the photodiode arrays 2-2 and 2-4 construct the second linear sensor pair.

FIG. 4 shows an example of a layout of the photodiode arrays 2-1 and 2-2 (it is now assumed that each photodiode array is constructed by five pixels for simplicity of explanation). The photodiode array 2-1 is constructed by photodiodes (photosensing units) 40-U1 to 40-U5. The photodiode array 2-2 is constructed by photodiodes (photosensing units) 40-L1 to 40-L5. The photodiodes 40-U1 to 40-U5 and the photodiodes 40-L1 to 40-L5 are arranged at the same pixel pitch. Although the pixel includes a MOS transistor for resetting and a differential amplifier besides the photodiodes as will be explained hereinafter, the MOS transistor for resetting and the differential amplifier are omitted and only the photodiodes and the isolation regions are shown in FIG. 4. The MOS transistor for resetting and the differential amplifier are provided in a light shielding layer 43 and formed so as to be adjacent to a photodiode forming region, respectively.

Although the light shielding layer 43 is formed so as to shield the resetting MOS transistor and the differential amplifier from the light, no light shielding layers are formed between the photodiode arrays 2-1 and 2-2 and between the photodiode arrays 2-3 and 2-4. The reason why the light shielding layers are not formed is to reduce a non-sensitive region to be as small as possible, thereby allowing the photodiode arrays to be neighboring. This is also because if the photodiode arrays are away, a positional deviation occurs and it is difficult to detect a fine pattern. If the light shielding layer is narrow, there is not particularly a problem even when the dead zone region exists.

Figure 2:
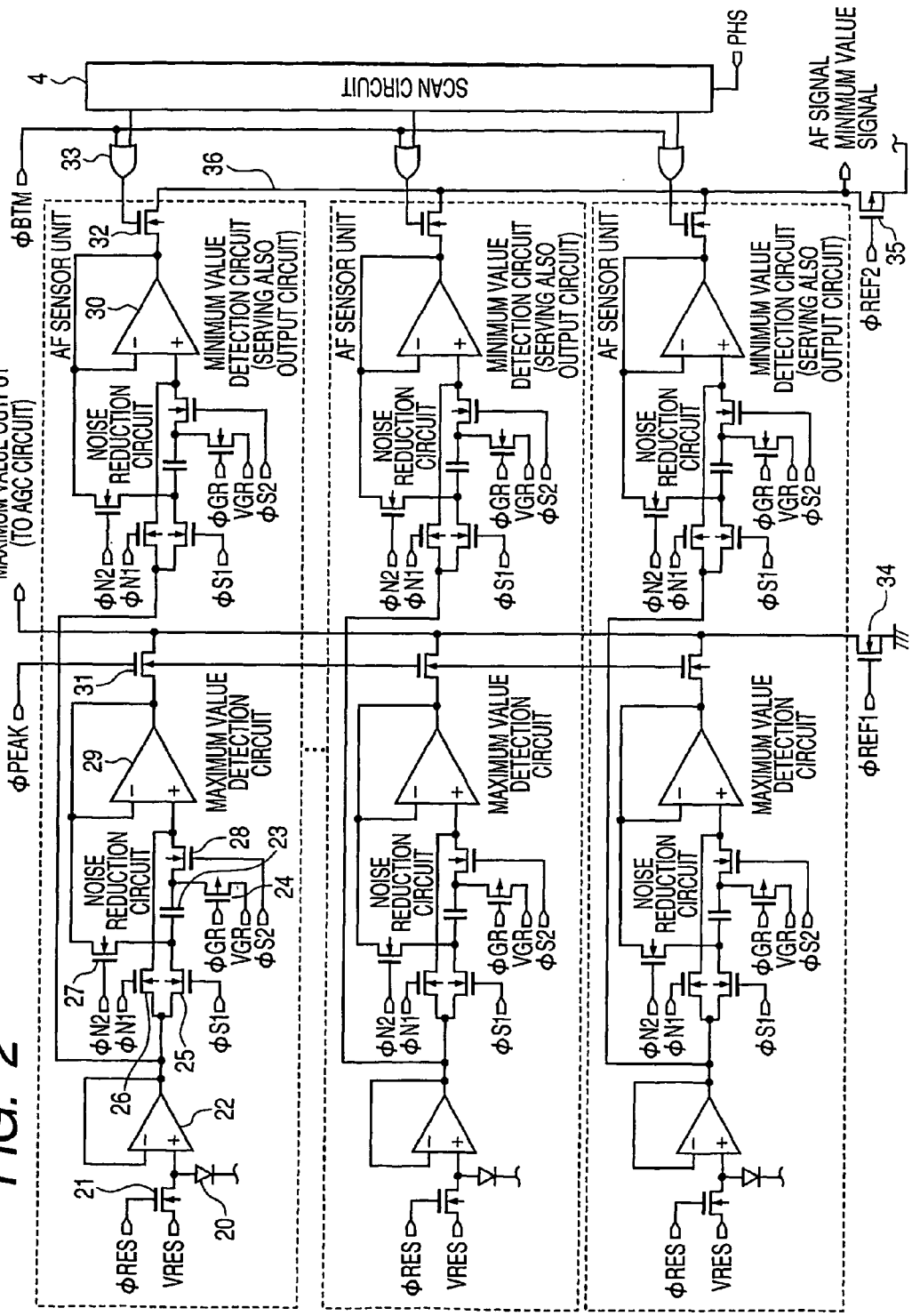
FIG. 2 is a constructional diagram of an AF circuit of the first embodiment of the invention.
Figure 3:
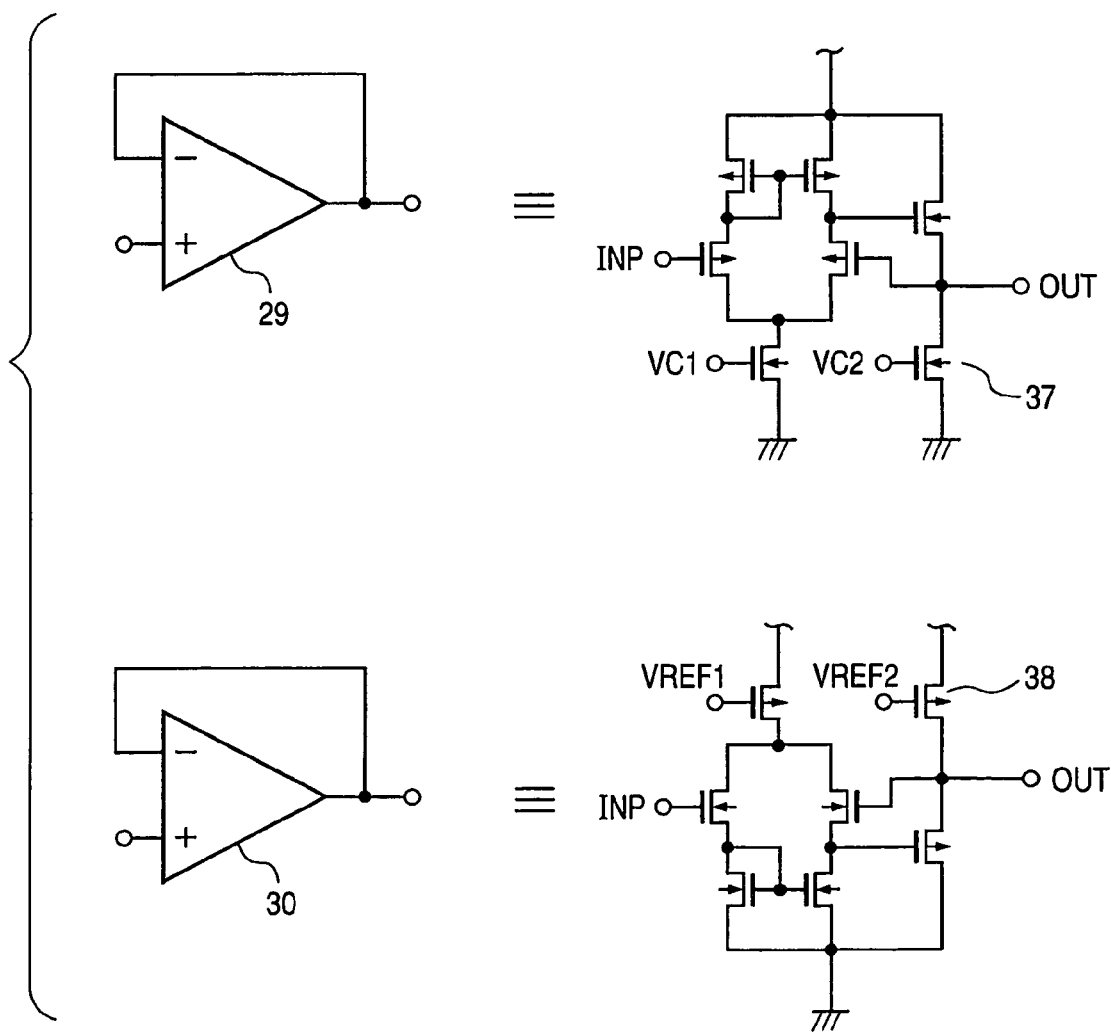
FIG. 3 is a diagram showing constructions of a maximum value detection circuit and a minimum value detection circuit in the AF circuit construction mentioned above.

FIG. 2 shows a specific circuit diagram of an AF linear sensor circuit comprising the photodiode array 2 and the AF sensor readout circuit 3. FIG. 3 is a diagram showing specific circuit constructions of differential amplifiers 29 and 30.

The AF linear sensor circuit (CMOS linear type AF sensor) shown here is the circuit proposed previously by the applicant of the present invention in Japanese Patent Application Laid- Open No. 2000-180706 or the like. The AF linear sensor circuit is constructed by a plurality of AF sensor units.

In FIG. 2, reference numeral 20 denotes a pn junction photodiode for executing photoelectric conversion; 21 a resetting MOS transistor for resetting an electric potential of the photodiode 20 to VRES; and 22 a differential amplifier whose positive input terminal (+) is connected to the photodiode 20 and whose inverting input terminal (−) is connected to its output terminal. An amplifying type photoelectric converting device is constructed by the pn junction photodiode 20, resetting MOS transistor 21, and differential amplifier 22 and becomes one of the pixels of the photodiode array 2.

Reference numeral 23 denotes a clamp capacitor and 24 indicates a MOS switch for inputting a clamp electric potential into the clamp capacitor 23. A clamp circuit is constructed by the clamp capacitor 23 and the MOS switch 24. Reference numerals 25 to 28 denote MOS transistors for switching; 29 the differential amplifier for detecting the maximum value; and 30 the differential amplifier for detecting the minimum value also serving as an AF signal outputting circuit. Each of the differential amplifiers constructs a voltage follower circuit. An output of the differential amplifier 22 is inputted to the maximum value detection circuit through the clamp circuit and inputted to the minimum value detection circuit also serving as an AF signal outputting circuit through the clamp circuit.

Reference numeral 31 denotes a MOS switch for outputting the maximum value; 32 a MOS switch for outputting the minimum value; 33 an OR circuit; 34 an NMOS transistor for a constant current; and 35 a PMOS transistor for a constant current. As shown in FIG. 3, the final stage of the minimum value detection circuit is a PMOS source follower circuit and the final stage of the maximum value detection circuit is an NMOS source follower circuit. An output signal of the scan circuit 4 is inputted to the OR circuit, thereby allowing the minimum value outputs from the AF sensor units to be sequentially and selectively outputted. Reference numeral 36 denotes a common output line to which the signals or the minimum value outputs from the pixels are outputted.

Since the details of the operation of the present circuit have already been described in Japanese Patent Application Laid-Open 2000-180706, the operation will be schematically explained here.

The resetting MOS transistor 21 is turned on by a signal φRES, thereby resetting the photodiode. The switching MOS transistors 26 and 27 are turned on by signals φN1 and φN2, thereby allowing an output of the differential amplifier 22 to be held into the clamp capacitor 23 through the switching MOS transistor 25, the maximum value detection circuit (minimum value detection circuit), and the switching MOS transistor 27. The signal which is held in the clamp capacitor contains offset components of the differential amplifiers constructing the maximum value detection circuit and the minimum value detection circuit. The signal from the differential amplifier 22 is inputted to the clamp circuit. When the signal is outputted through the maximum value detection circuit and the minimum value detection circuit, the offset components of the differential amplifiers are also eliminated and the resultant signal can be outputted. By turning all of the maximum value outputting MOS switches 31 on by a signal φPEAK, the maximum value outputs can be outputted to the AGC circuit. By turning all of the minimum value outputting MOS switches 32 on by a signal φBTM through the OR circuit 33, the minimum value outputs are outputted to the common output line 36. By sequentially turning on the minimum value outputting MOS switches 32 by the scan circuit through the OR circuit 33, the AF signals are outputted to the common output line 36 (at this time, the minimum value detection circuit is made operative as an AF output circuit). When the minimum value is outputted from the minimum value detection circuit 30, a constant current MOS transistor 38 in FIG. 3 is turned off. When the minimum value detection circuit 30 is operated as an AF output circuit, the constant current MOS transistor 38 in FIG. 3 is turned on.

In the construction of the present circuit, by providing the feedback type noise clamp circuits at the front stage of the maximum value detection circuit and the minimum value detection circuit, the reset noises which are generated in the photodiodes and the FPN which are generated in the sensor amplifiers, the maximum value detection circuit, and the minimum value detection circuit can be eliminated. The voltage follower circuit whose final output stage is a source follower circuit is constructed for every pixel, the constant current source at the output stage of each voltage follower is turned off at the time of the output of the minimum value, and the voltage follower circuits are connected in common to an output line connected to the constant current source, so that the minimum value of the AF sensor signal can be obtained. At the time of the output of the AF sensor signal, by turning on the constant current source at the output stage of each voltage follower and sequentially connecting the voltage follower circuits to the output line, the serial AF sensor signal can be obtained. Since the minimum value detection circuit is also used in common as a signal outputting circuit by the above operation, the chip can be miniaturized.

Effects of the linear sensors arranged in the zigzag manner will now be described. FIG. 4 is a diagram using a part of the sensors arranged in the zigzag manner and a slit-shaped object image for simplicity of explanation.

Figure 12:
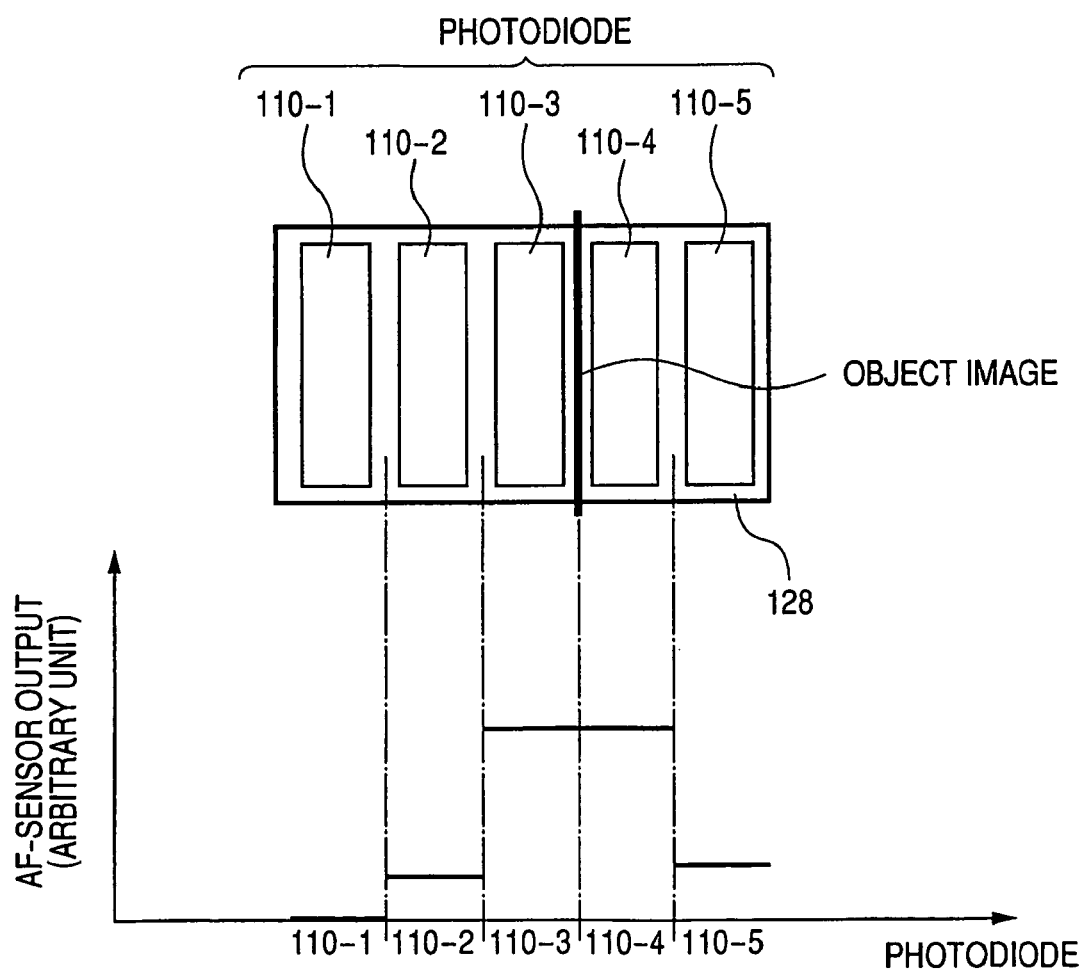
FIG. 12 is a diagram for explaining a problem of the conventional AF sensor.

In FIG. 4, reference numeral 41 denotes an isolation region and 42 a slit light. In a sensor shown in FIG. 12, if the object image is formed on the isolation region, the operation becomes unstable. However, in the case of constructing as shown in FIG. 4, the object image is formed on the isolation region between the photodiodes 40-L3 and 40-L4 of the photodiode array 2-2. Even if it is unknown that the peak of the object image exists in which one of the right and left diodes of the isolation region, the object image is formed on the photodiode 40-U3 in the other photodiode array 2-1 and the peak position is unconditionally determined, so that the operation does not become unstable. Usually, since the signal process can be executed by using both of the linear sensor outputs, another effect in which the S/N ratio is multiplied by ½ is also obtained. Therefore, the AF precision and detecting sensitivity which are higher than those of the conventional device can be obtained even in the case of the same pixel size as that of the conventional device without an unreasonable decrease in pixel pitch.

In the embodiment, the linear sensors having different base-line lengths (each of which is a distance between the optical center of the linear sensor for the base portion and that of the linear sensor for the reference portion) are further provided at positions which perpendicularly cross the linear sensor pairs arranged in the zigzag manner. As shown in FIG. 1, a linear sensor pair (2-5, 2-8) of a base-line length B is provided outside of a linear sensor pair (2-6, 2-7) of a base-line length A (B>A). It is desirable that the linear sensor pair (2-6, 2-7) of the base-line length A and the linear sensor pair (2-5, 2-8) of the base-line length B are arranged on the same straight line to prevent a deviation of a field of view. Since the sensitivity (AF resolution) of the linear sensor pair of the larger base-line length is higher, the AF of the higher precision can be realized. However, since a light beam obtained through the photographing Lens whose F number is small is used, there is such a restriction that the above construction cannot be used for a dark lens (F number is large). However, since a depth of field of the photographing lens whose F number is large is large, no problem will occur.

In the embodiment, the first linear sensor pair (2-1, 2-3) and the second linear sensor pair (2-2, 2-4) are arranged at the line-symmetrical positions (flip layout) while deviating the second linear sensor pair (2-2, 2-4) in the arranging direction of the linear sensors (photodiode arrays) by the length corresponding to the half pixel (0.5 pixel). The arranging direction of the linear sensors (photodiode arrays) is, for example, the arranging direction of the photodiode array (linear sensor) 2-1 and the photodiode array (linear sensor) 2-3. If there is no aberration in the 2-dimensional image forming optical system, it is optimum to deviate the linear sensors (photodiode arrays) by 0.5 pixel as shown in the embodiment. However, if there is an optical aberration, it is desirable to deviate them by a distance within a range from 0.5 to 1 pixel in order to allow correction of the optical aberration to be included. However, a deviation amount of the linear sensors is not particularly limited but the effects of the invention can be obtained so long as there is an arbitrary deviation.

Although there is such a problem that, in general, when the number of linear sensor pairs increases, the speed decreases, in the embodiment, by independently drive-processing the accumulation time control (AGC) of the linear sensor pairs in parallel, both of the high speed and the high precision are realized. The method whereby the AGC is independently controlled has been disclosed in, for example, Japanese Patent Application Laid-Open No. 2003-107340.

Therefore, even if the number of linear sensors increases, the speed is not decreased and the high response speed that is equal to that of the conventional device can be realized. It is desirable to make the accumulation time control in a real-time manner. Also with respect to current consumption, since the CMOS circuits are used, no problem will occur. In the embodiment, not only the photoelectric converting devices but also all of the (logic, analog) devices are constructed by the CMOS circuits and the CMOS type solid-state image pickup device which can be manufactured by the CMOS processes is constructed (it is not always necessary to form all of the component parts by the CMOS circuits).

It is preferable that all of the photodiode arrays 2 (including the photodiode arrays 2-1 to 2-8) constructing the linear sensors are set to the same pixel size (layout pitch). By setting them to the same pixel size, the developing load, the developing period of time, and the developing costs can be reduced. Since the photoelectric converting characteristics are also equalized, a correction system (sensitivity variation, shading, and the like) is also simplified.

In the embodiment, the solid-state image pickup device for the AF having the AF ability of the high precision, high stability, and high sensitivity can be realized although the same manufacturing processes and design rules as those of the conventional device are used. Naturally, the embodiment can be also applied to a VMIS (Threshold Voltage Modulation Image Sensor), a BCAST (Buried Charge Accumulator and Sensing Transistor Array), an LBCAST (Lateral Buried Charge Accumulator and Sensing Transistor Array), and the like. Particularly, with respect to the BCAST and LBCAST, such a device can be realized without an essential change by replacing the amplifying MOS transistors by JFET transistors.

EMBODIMENT 2

Figure 5:
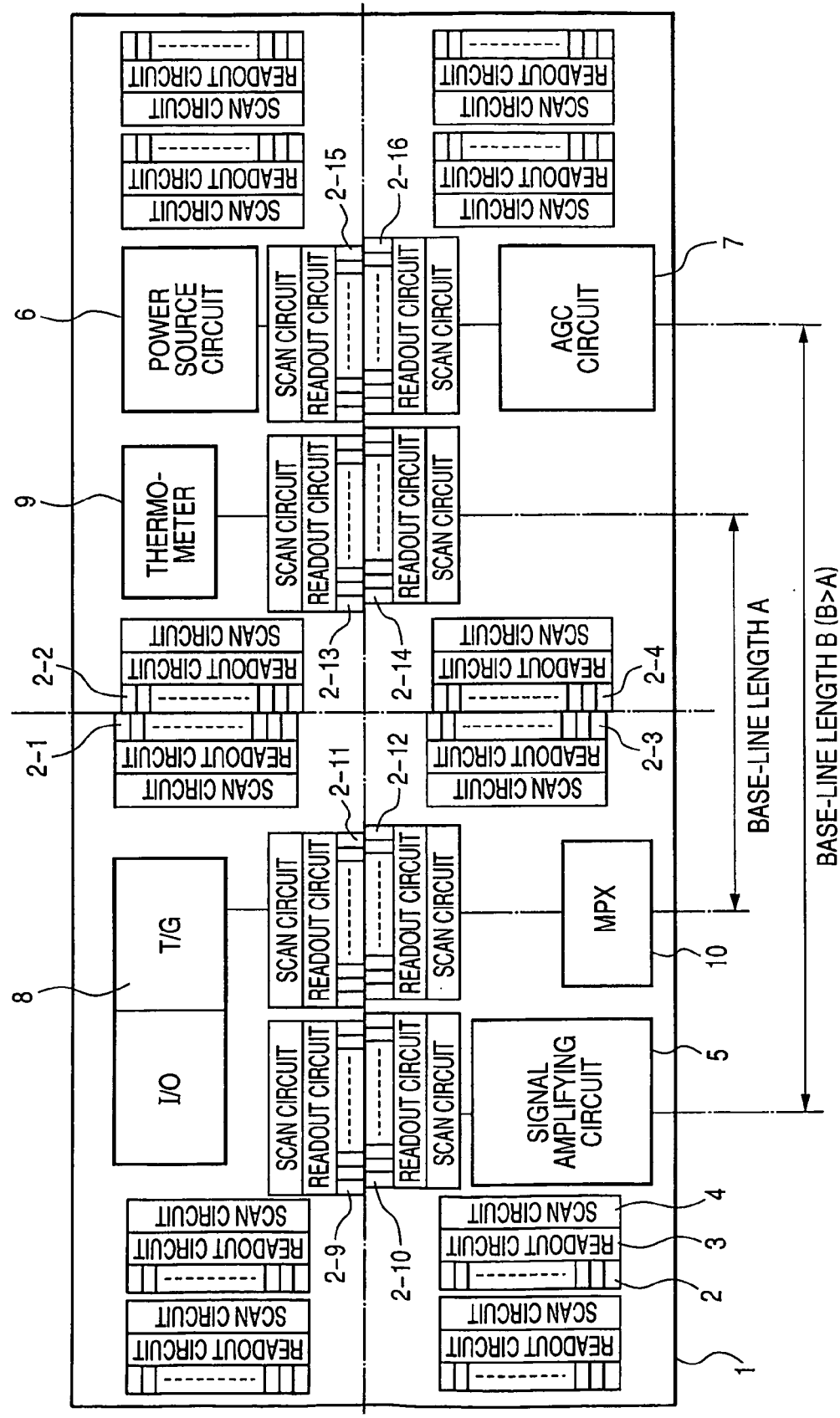
FIG. 5 is a plan view showing a layout of the second embodiment of the invention.
Figure 6:
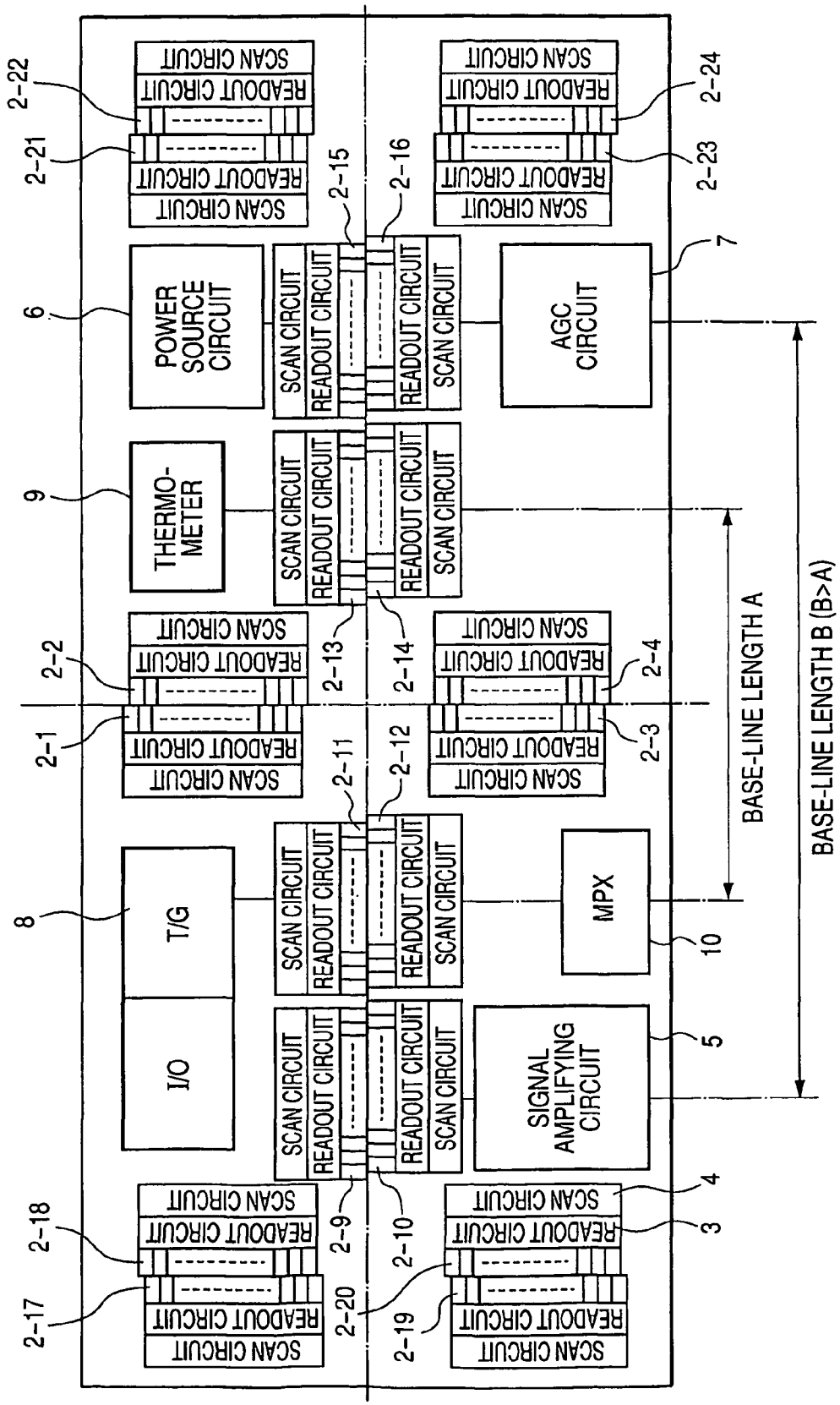
FIG. 6 is a plan view showing another form of the second embodiment of the invention.

FIG. 5 shows a plan view of a layout in the second embodiment to which the invention is applied. In FIG. 5, the same component elements as those in FIG. 1 are designated by the same reference numerals and their detailed description is omitted here. In the second embodiment, the linear sensors arranged in a zigzag manner are also provided in the AF line of a large base-line length. That is, photodiode arrays 2-11 and 2-13 construct the first linear sensor pair and photodiode arrays 2-12 and 2-14 construct the second linear sensor pair. Photodiode arrays 2-9 and 2-15 construct the first linear sensor pair and photodiode arrays 2-10 and 2-16 construct the second linear sensor pair. According to the embodiment, at the center detecting point, the focusing precision and sensitivity can be further improved. The linear sensors which are arranged in a zigzag manner can be also provided at all detecting points as shown in FIG. 6. In FIG. 6, the same component elements as those in FIG. 1 are designated by the same reference numerals. Further, naturally, the invention is also effective even in the case where the number of detecting points is increased like 11-point AF, 15-point AF, or the like.

EMBODIMENT 3

Figure 7:
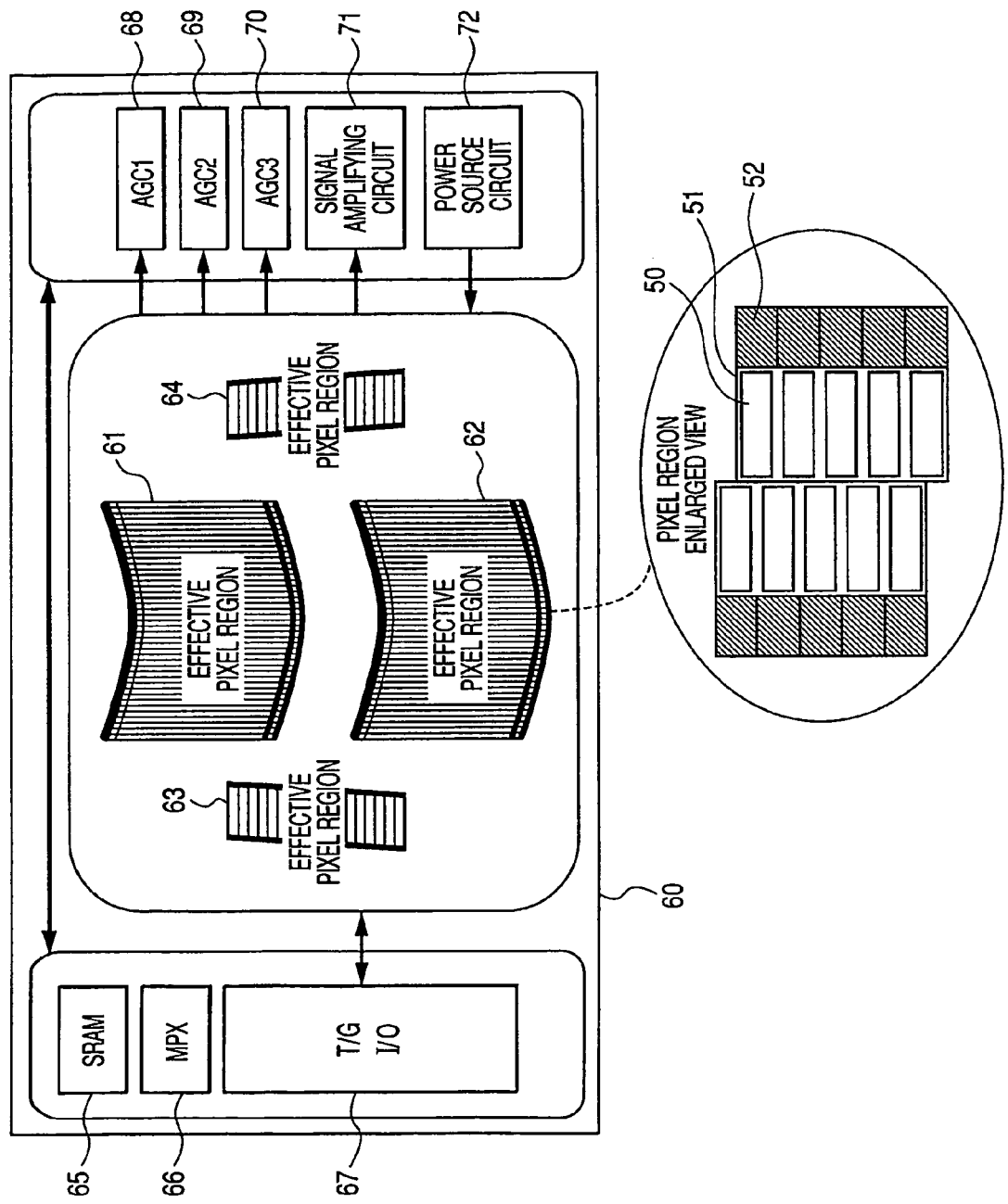
FIG. 7 is a plan view showing a layout of the third embodiment of the invention.

FIG. 7 shows a plan view of a layout in the third embodiment to which the invention is applied. In the third embodiment, an example in which the invention is applied to an area type AF sensor is shown. The area type AF sensor has been disclosed in Japanese Patent Application Laid-Open H11-191867 or the like by the same applicant as the present invention. In the diagram, reference numeral 50 denotes a photodiode; 51 an isolation region; 52 a pixel amplifier region for amplifying photocharges; 61 to 64 effective pixel regions; 65 an SRAM; 66 a multiplexer circuit (MPX); 67 a logic circuit & I/O circuit; 68 to 70 AGC circuits; 71 a signal amplifying circuit; and 72 a power source circuit. Although the TTL passive-type phase detection system AF is executed by the linear sensor pairs in the embodiments 1 and 2, the TTL passive-type phase detection system AF is executed by the area sensor pairs in the embodiment 3. It is a feature of the embodiment 3 to execute the AF by the two area sensor pairs arranged in a zigzag manner so as to be neighboring as shown in FIG. 7. By using the area sensor, the auto-focus for a wider region can be executed. Also in the embodiment, the high precision and the high sensitivity of the AF ability of the area type AF sensor can be realized.

EMBODIMENT 4

Figure 8:
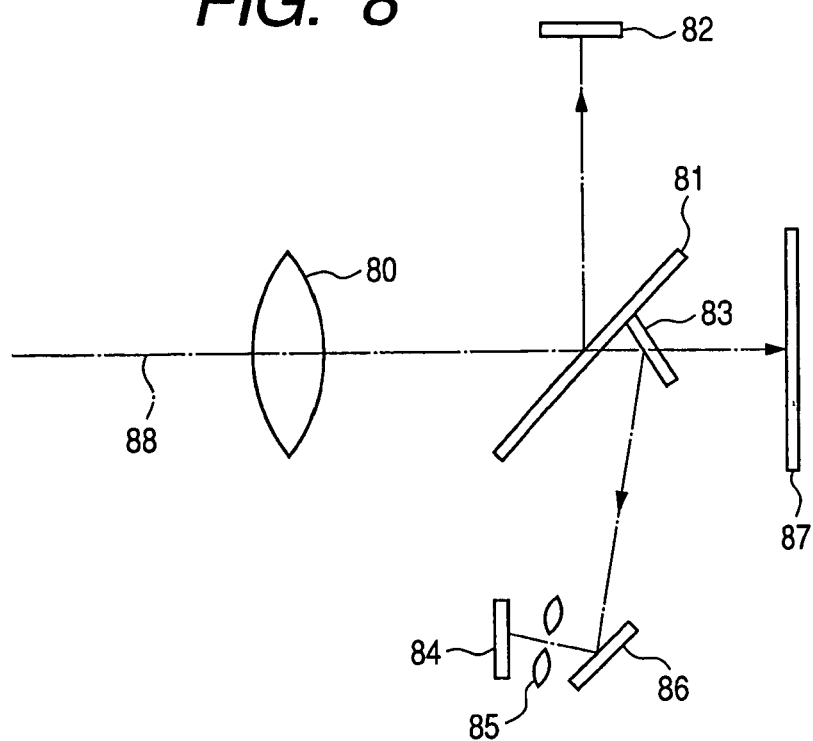
FIG. 8 is an explanatory diagram of an optical system of a camera according to the fourth embodiment of the invention.
Figure 9:
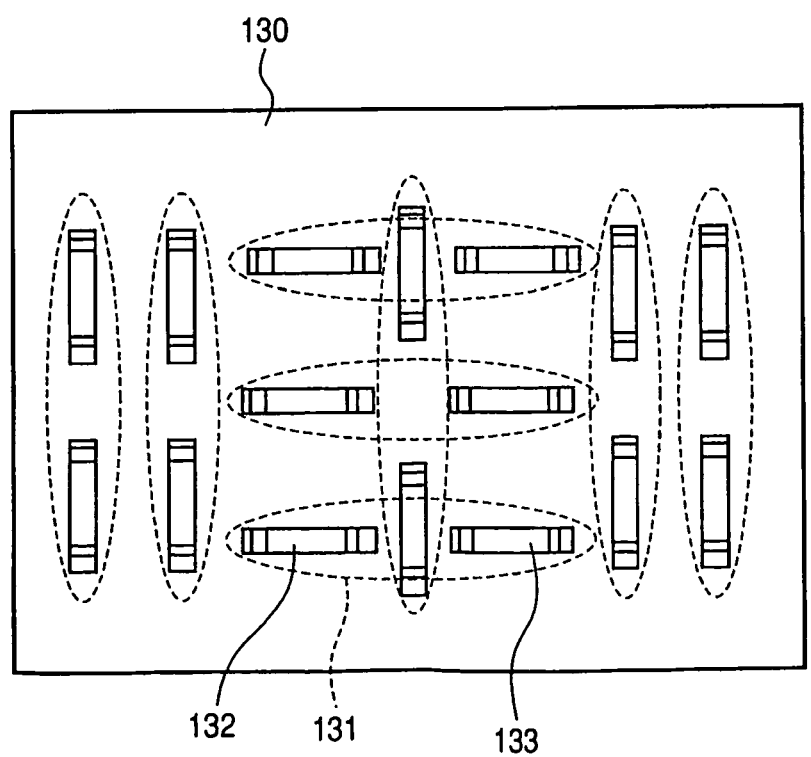
FIG. 9 is a schematic plan view showing a conventional layout.
Figure 10:
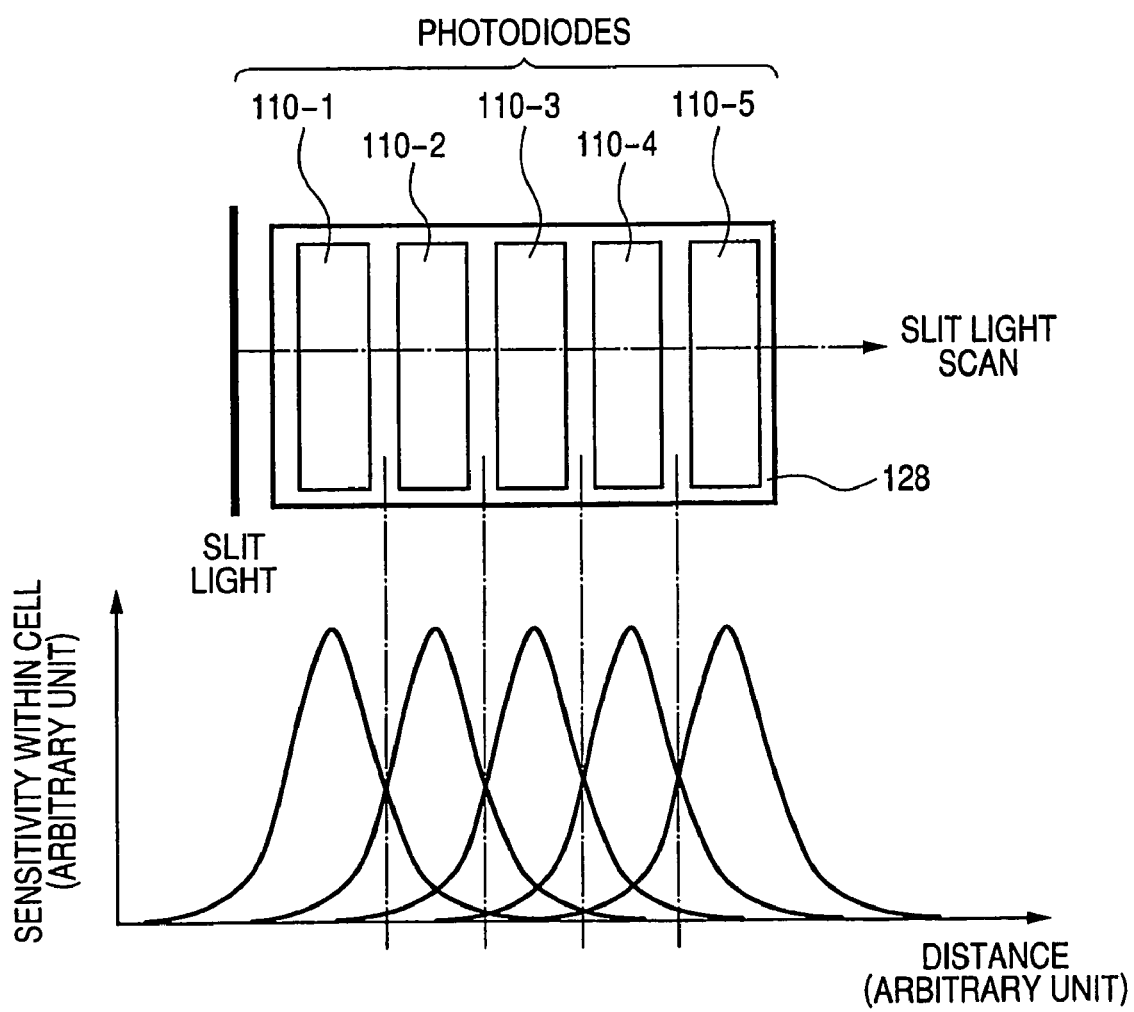
FIG. 10 is a diagram for explaining a sensitivity within a cell of an AF sensor.
Figure 11:
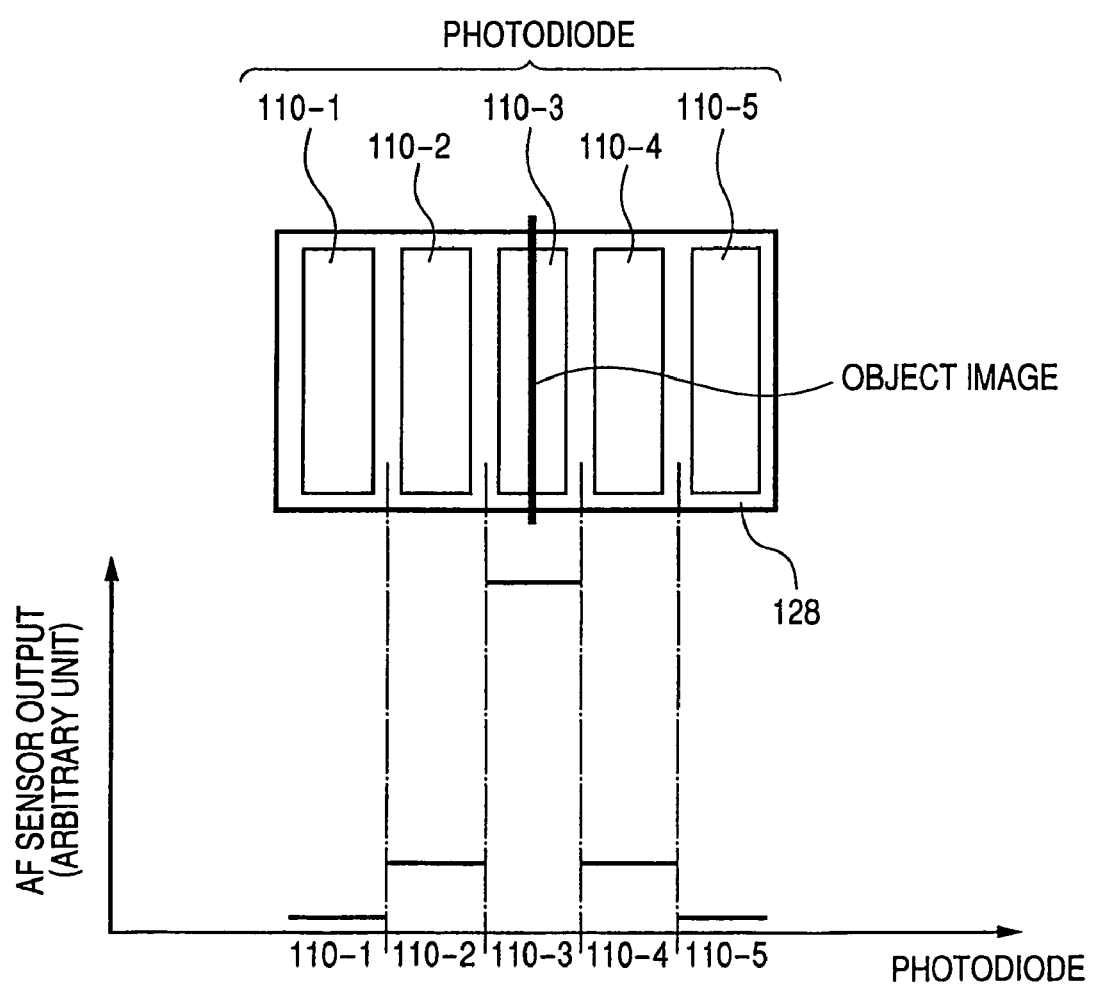
FIG. 11 is a diagram for explaining an output example of a conventional AF sensor.

FIG. 8 shows a schematic diagram of an optical system of a single-lens reflex camera in which the TTL-SIR type autofocus system using the invention has been installed. In FIG. 8, reference numeral 80 denotes a photographing lens for temporarily forming an object image onto a film or an image sensor and 81 indicates a quick return mirror for reflecting the light to a finder screen 82; The quick return mirror 81 is a half mirror which transmits the light of tens of %. Reference numeral 83 denotes a submirror for guiding the light to the AF system; 84 a solid-state image pickup device for the AF; 85 a secondary image forming lens (glasses lens) for forming the object image again onto the AF sensor; 86 a reflecting mirror for guiding the light to an AF sensor 44; 87 a focal plane shutter; and 88 a principal axis of the light beam.

In the embodiment 4, by using the solid-state image pickup devices for the AF disclosed in the embodiments 1 to 3, the single-lens reflex camera having the higher focusing precision than that in the conventional device can be realized without raising the costs. Naturally, the invention is not limited to an analog camera and a digital camera, it can be also applied to an arbitrary TTL-SIR type camera.

The invention can be applied to an apparatus with an auto-focus sensor of the TTL-SIR (Through The Lens Secondary Imaged Registration: secondary image forming, phase difference detection) type, for example, an auto-focus camera or the like.

This application claims priority from Japanese Patent Application No. 2004-115629 filed Apr. 9, 2004, which is hereby incorporated by reference herein.

The invention claimed is:

1. An auto-focus sensor comprising:
first and second linear sensor pairs, each having a linear sensor for a base portion with a plurality of pixels and a linear sensor for a reference portion with a plurality of pixels, in order to perform a focal point detection of a phase difference detecting type,
wherein said first linear sensor pair and said second linear sensor pair have a same pixel pitch, wherein said first linear sensor pair and said second linear sensor pair are neighboring in parallel and are arranged so as to be relatively deviated in the arranging direction of said linear sensor for the base portion and said linear sensor for the reference portion, wherein a signal output to detect the focal point is executed by using both of said first linear sensor pair and said second linear sensor pair, wherein there is no light shielding layer between photoelectric converting devices of said first linear sensor pair and said second linear sensor pair, wherein said first linear sensor pair and said second linear sensor pair are arranged to be shifted from each other so that a photosensing unit of a pixel of said first linear sensor pair is adjacent to an element isolation region included in said second linear sensor pair, and wherein said first linear sensor pair and said second linear sensor pair are adjacent so that an object image is focused on both of photosensing units of the pixels of said first and second linear sensor pairs;
a third linear sensor pair arranged in a direction which perpendicularly crosses said first and second linear sensor pairs; and
a fourth linear sensor pair having a base-line length larger than that of said third linear sensor pair,
wherein said fourth linear sensor pair is arranged outside of said third linear sensor pair in a direction of the base-line length,
wherein said third linear sensor pair and said fourth linear sensor pair are arranged on the same straight line,
wherein said first to fourth linear sensor pairs independently control an accumulation time of photo charges of a photoelectric converting element constructing a pixel, and
wherein said photoelectric converting element is an amplifying type of which accumulation time is controlled in real-time.

2. A sensor according to claim 1, wherein a deviation amount between said first linear sensor pair and said second linear sensor pair is approximately equal to 0.5 pixel.

3. A sensor according to claim 1, wherein a multi-point detection with respect to a plurality of object positions is executed, and a sensor for auto-focusing the object of at least the center of a display screen includes said first and second linear sensor pairs.

4. A sensor according to claim 1, wherein a multi-point detection with respect to a plurality of object positions is executed, and a sensor for auto-focusing the object of at least the center of a display screen includes said first to fourth linear sensor pairs.

5. A sensor according to claim 1, wherein all of said linear sensor pairs have the same pixel shape.

6. A sensor according to claim 1, wherein said sensor is a CMOS type sensor which can be manufactured by a CMOS process.

7. An auto-focus camera having the auto-focus sensor according to claim 1.

* * * * *